US012671632B2

(12) United States Patent
Zhang et al.

(10) Patent No.: US 12,671,632 B2
(45) Date of Patent: Jun. 30, 2026

(54) PERSONA-BASED USER EXPERIENCE FOR IP AND OPTICAL NETWORKING CONVERGENCE

(71) Applicant: Cisco Technology, Inc., San Jose, CA (US)

(72) Inventors: Randy Zhang, Manassas, VA (US); Rached Blili, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 213 days.

(21) Appl. No.: 18/411,119

(22) Filed: Jan. 12, 2024

(65) Prior Publication Data

US 2025/0233806 A1 Jul. 17, 2025

(51) Int. Cl.
*G06F 3/048* (2013.01)
*H04L 41/22* (2022.01)

(52) U.S. Cl.
CPC .................................. *H04L 41/22* (2013.01)

(58) Field of Classification Search
CPC ...................................................... H04L 41/22
See application file for complete search history.

(56) References Cited

U.S. PATENT DOCUMENTS

| | | | | |
|---|---|---|---|---|
| 12,443,797 | B1 * | 10/2025 | Desai | G06F 40/295 |
| 2008/0031997 | A1 | 2/2008 | Bazzo et al. | |
| 2012/0036462 | A1 * | 2/2012 | Schwartz | G06F 8/10 |
| | | | | 715/771 |
| 2016/0275082 | A1 | 9/2016 | White et al. | |

| | | | | |
|---|---|---|---|---|
| 2017/0345059 | A1 * | 11/2017 | Daniel | G06Q 50/01 |
| 2018/0041401 | A1 * | 2/2018 | Hugman | H04L 41/22 |
| 2020/0159501 | A1 | 5/2020 | Bodin et al. | |
| 2020/0204489 | A1 * | 6/2020 | Pianigiani | G06F 9/5072 |
| 2020/0412763 | A1 * | 12/2020 | Mercian | H04L 63/101 |
| 2021/0168016 | A1 * | 6/2021 | Rao | H04L 43/20 |
| 2022/0051661 | A1 * | 2/2022 | Park | G06N 3/0475 |
| 2022/0060409 | A1 * | 2/2022 | Mereddy | H04L 41/12 |
| 2022/0414741 | A1 * | 12/2022 | Ozcan | G06Q 30/0631 |

(Continued)

FOREIGN PATENT DOCUMENTS

EP      2239956 A1    10/2010

OTHER PUBLICATIONS

Szymczak, G., "The Power of Unity—IP/Optical Convergence Solutions," Comarch TelcoReview Blog, Aug. 29, 2023, 6 pages.

*Primary Examiner* — David Phantana-angkool
(74) *Attorney, Agent, or Firm* — Edell, Shapiro & Finnan, LLC

(57) ABSTRACT

A method to manage a network through a persona-based user experience. The method includes exposing a first user interface consistent with a first technology expertise to a first user, receiving, as input from the first user via the first user interface, first information sufficient to complete a first task of a job that relies on both the first technology expertise and on a second technology expertise, wherein the first user interface includes a first image representative of the first task, in response to detecting that the first task is complete, exposing a second user interface consistent with the second technology expertise to a second user, and receiving, via the second user interface, as input from the second user, second information sufficient to complete a second task of the job, wherein the second user interface includes a second image representative of the second task.

20 Claims, 10 Drawing Sheets

(56)                    References Cited

U.S. PATENT DOCUMENTS

| | | | |
|---|---|---|---|
| 2023/0135179 A1* | 5/2023 | Mielke .................. | G06N 5/022 |
| | | | 704/232 |
| 2025/0233806 A1* | 7/2025 | Zhang .................... | H04L 41/22 |
| 2025/0301317 A1* | 9/2025 | Li ........................ | H04W 12/06 |
| 2025/0315142 A1* | 10/2025 | Gilabert Llop ......... | G06F 9/453 |

* cited by examiner

USER TABLE

| USER NAME | TYPE | TECHNOLOGY PERSONA |
|-----------|------|--------------------|
| BOB | ADMIN | |
| ALICE | REGULAR | IP |
| MARK | REGULAR | OPTICAL |
| JANE | REGULAR | CONVERGENCE |

FIG.2

TECHNOLOGY PERSONA TABLE

| TECHNOLOGY PERSONA | PERSONA SPECIFIC CABABILITY | | | |
|--------------------|-----------|---------------|--------------|-------------|
| | INVENTORY | VISUALIZATION | PROVISIONING | MAINTENANCE |
| IP | YES | YES | YES | YES |
| OPTICAL | YES | YES | YES | YES |
| CONVERGENCE | YES | YES | NO | YES |

FIG.3

JOB TABLE

| JOB ID | TYPE | USER NAME | STATUS | ENDPOINT A | ENDPOINT A PORT | ENDPOINT Z | ENDPOINT Z PORT | BANDWIDTH | JOB DETAIL |
|---|---|---|---|---|---|---|---|---|---|
| J24DHF7D | P2P OPTICAL SERVICE | MARK | COMPLETED | ROUTER 1 | DCO PORT 1 | ROUTER 2 | DCO PORT 2 | 400G | J24DHF7D |

FIG.4

JOB QUEUE TABLE

| QUEUE ID | TYPE | STATUS | USER NAME | USER PERSONA | NEXT ASSIGNED USER | NEXT ASSIGNED PERSONA | JOB ID | QUEUE LOG |
|---|---|---|---|---|---|---|---|---|
| QD10XEG | SERVICE PROVISIONING | IN PROGRESS | MARK | OPTICAL | ALICE | IP | J24DHF7D | QD10XEG |

FIG.5

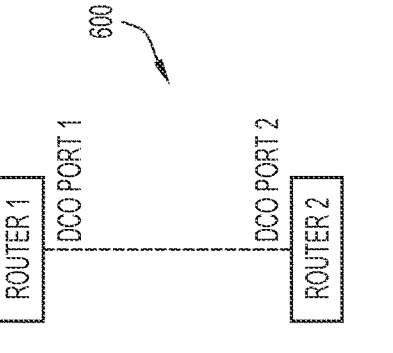

ROUTER 1

DCO PORT 1

600

DCO PORT 2

ROUTER 2

FIG.6

| JOB ID | TYPE | USER NAME | STATUS | ENDPOINT A | ENDPOINT A PORT | ENDPOINT Z | ENDPOINT Z PORT | BANDWIDTH | JOB DETAIL |
|---|---|---|---|---|---|---|---|---|---|
| JCFD001Q | P2P IP SERVICE | ALICE | COMPLETED | ROUTER 1 | DCO PORT 1 | ROUTER 2 | DCO PORT 2 | 400G | JCFD001Q |

FIG.7

| QUEUE ID | TYPE | STATUS | USER NAME | USER PERSONA | NEXT ASSIGNED USER | NEXT ASSIGNED PERSONA | JOB ID | QUEUE LOG |
|---|---|---|---|---|---|---|---|---|
| QD10XEG | SERVICE PROVISIONING | IN PROGRESS | ALICE | IP | MARK | OPTICAL | JCFD001Q | QD10XEG |

FIG.8

| JOB ID | TYPE | USER NAME | STATUS | ENDPOINT A | ENDPOINT A PORT | ENDPOINT Z | ENDPOINT Z PORT | BANDWIDTH | JOB DETAIL |
|---|---|---|---|---|---|---|---|---|---|
| J24DHF7D | P2P OPTICAL SERVICE | MARK | COMPLETED | ROUTER 1 | DCO PORT 1 | ROUTER 2 | DCO PORT 2 | 400G | J24DHF7D |

| QUEUE ID | TYPE | STATUS | USER NAME | USER PERSONA | NEXT ASSIGNED USER | NEXT ASSIGNED PERSONA | JOB ID | QUEUE LOG |
|---|---|---|---|---|---|---|---|---|
| QD10XEG | SERVICE PROVISIONING | IN PROGRESS | MARK | OPTICAL | ALICE | IP | J24DHF7D | QD10XEG |

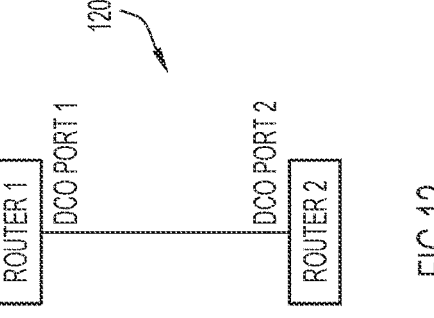

1200

ROUTER 1

DCO PORT 1

DCO PORT 2

ROUTER 2

FIG.12

| JOB ID | TYPE | USER NAME | STATUS | ENDPOINT A | ENDPOINT A PORT | ENDPOINT Z | ENDPOINT Z PORT | BANDWIDTH | JOB DETAIL |
|---|---|---|---|---|---|---|---|---|---|
| JCFK921Q | P2P IP SERVICE | ALICE | COMPLETED | ROUTER 1 | DCO PORT 1 | ROUTER 2 | DCO PORT 2 | 400G | JCFK921Q |

FIG.13

| QUEUE ID | TYPE | STATUS | USER NAME | USER PERSONA | NEXT ASSIGNED USER | NEXT ASSIGNED PERSONA | JOB ID | QUEUE LOG |
|---|---|---|---|---|---|---|---|---|
| QD10XEG | SERVICE PROVISIONING | COMPLETED | ALICE | IP | | | JCFK921Q | QD10XEG |

FIG.14

CREATE PERSONAS — 1610

RECEIVE LOGIN OF TECHNOLOGY EXPERT — 1612

PRESENT TECHNOLOGY EXPERT WITH UI ASSOCIATED WITH CORRESPONDING PERSONA — 1614

RECEIVE DATA/INFORMATION ASSOCIATED WITH JOBS/TASKS — 1616

UPDATE SHARED DATABASE — 1618

RECEIVE LOGOUT OF TECHNOLOGY EXPERT — 1620

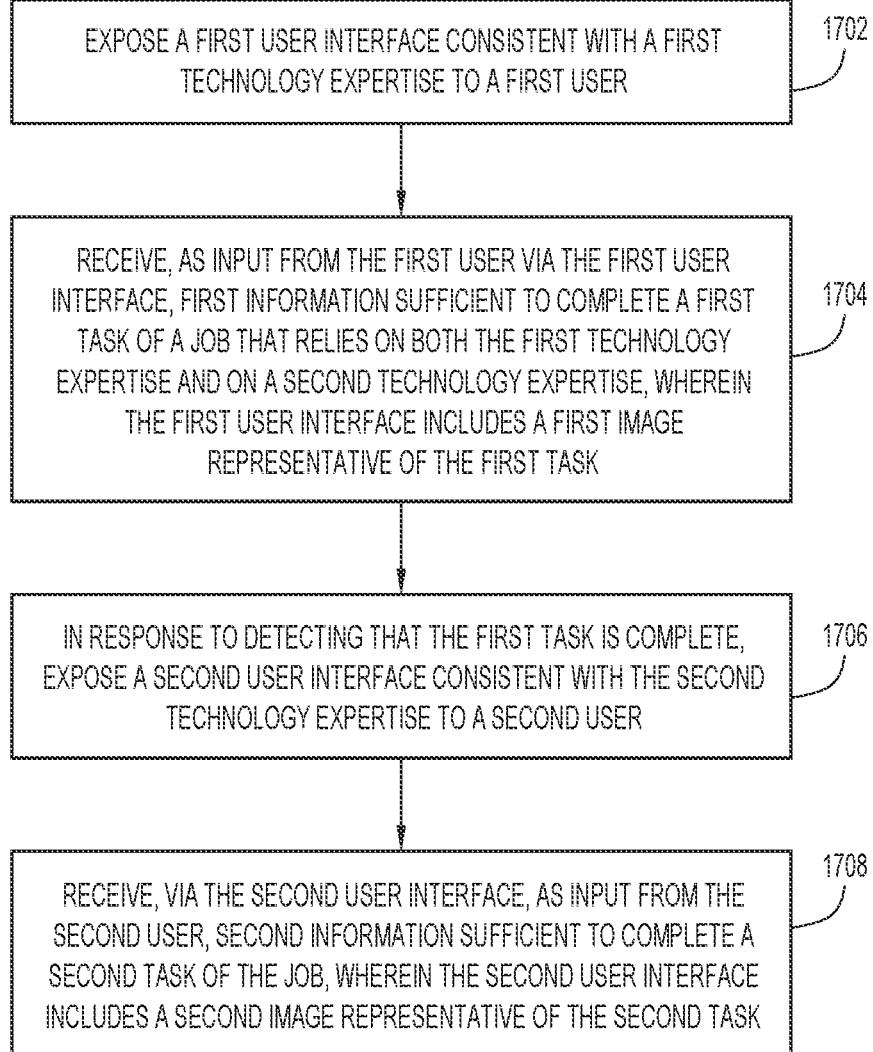

EXPOSE A FIRST USER INTERFACE CONSISTENT WITH A FIRST
TECHNOLOGY EXPERTISE TO A FIRST USER                                    1702

RECEIVE, AS INPUT FROM THE FIRST USER VIA THE FIRST USER
INTERFACE, FIRST INFORMATION SUFFICIENT TO COMPLETE A FIRST
TASK OF A JOB THAT RELIES ON BOTH THE FIRST TECHNOLOGY
EXPERTISE AND ON A SECOND TECHNOLOGY EXPERTISE, WHEREIN
THE FIRST USER INTERFACE INCLUDES A FIRST IMAGE
REPRESENTATIVE OF THE FIRST TASK                                        1704

IN RESPONSE TO DETECTING THAT THE FIRST TASK IS COMPLETE,
EXPOSE A SECOND USER INTERFACE CONSISTENT WITH THE SECOND
TECHNOLOGY EXPERTISE TO A SECOND USER                                   1706

RECEIVE, VIA THE SECOND USER INTERFACE, AS INPUT FROM THE
SECOND USER, SECOND INFORMATION SUFFICIENT TO COMPLETE A
SECOND TASK OF THE JOB, WHEREIN THE SECOND USER INTERFACE
INCLUDES A SECOND IMAGE REPRESENTATIVE OF THE SECOND TASK               1708

FIG.17

PERSONA-BASED USER EXPERIENCE FOR IP AND OPTICAL NETWORKING CONVERGENCE

TECHNICAL FIELD

The present disclosure relates to systems and methodologies for coordinating and provisioning network connectivity in a converged Internet Protocol (IP) and optical network.

BACKGROUND

The telecommunications networking industry continues to evolve. For many years, the Internet Protocol, along with associated IP-centric routers and switches, underpinned networking. Over the years, optical fiber and related optical networking components have been adopted and integrated into the IP-based communications network. In this regard, the industry is moving to IP and optical convergence, which is a disruptive transformation that can bring significant savings to customers' capital and operational expenses. To achieve the full benefits of such a convergence, network operators are having to change how they operate their networks, in tooling, organizational structure, and processes. These changes are often costly, time consuming, and complex.

BRIEF DESCRIPTION OF THE DRAWINGS

FIG. 2 is a table stored by a PBUX database that lists users and their corresponding expertise, according to an example embodiment.

FIG. 3 is a table stored by the PBUX database that identifies persona-specific capabilities for respective technology personas, according to an example embodiment.

FIG. 4 is a job table stored by the PBUX database that tracks a job, according to an example embodiment.

FIG. 5 is a queue table stored by the PBUX database that tracks a job queue, according to an example embodiment.

FIG. 6 is an image displayed, via a first user interface, for a user having IP routing expertise, according to an example embodiment.

FIG. 7 shows an updated job table in view of completed IP routing tasks, according to an example embodiment.

FIG. 8 shows an updated queue table in view of completed IP routing tasks, according to an example embodiment.

FIG. 12 is an updated image displayed, via the first user interface, for a user having IP routing expertise, according to an example embodiment.

FIG. 13 shows an updated job table in view of further IP routing tasks, according to an example embodiment.

FIG. 14 shows an updated queue table in view of further IP routing tasks, according to an example embodiment.

FIG. 17 is a flowchart illustrating a series of operations that may be executed by PBUX logic, according to an example embodiment.

DETAILED DESCRIPTION

Overview

Figure 1:
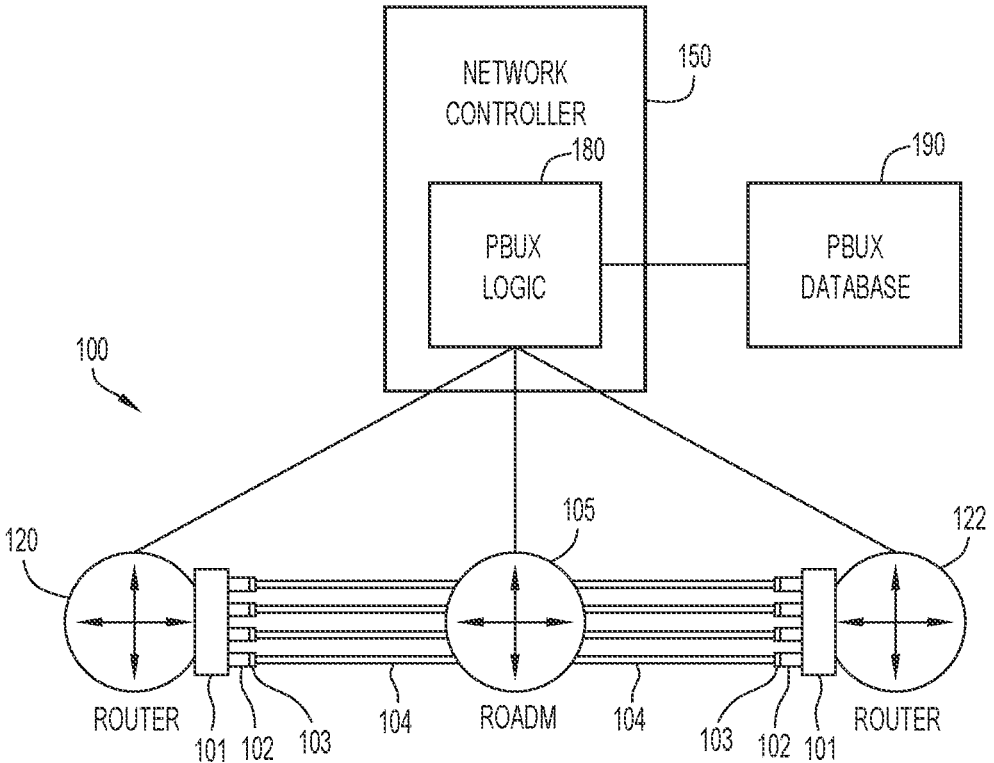
FIG. 1 shows a network including IP and optical components along with a network controller that is in communication with persona-based user experience (PBUX) logic, according to an example embodiment.

A method to manage a network through a persona-based user experience is described. The method includes exposing a first user interface consistent with a first technology expertise to a first user, receiving, as input from the first user via the first user interface, first information sufficient to complete a first task of a job that relies on both the first technology expertise and on a second technology expertise, wherein the first user interface includes a first image representative of the first task, in response to detecting that the first task is complete, exposing a second user interface consistent with the second technology expertise to a second user, and receiving, via the second user interface, as input from the second user, second information sufficient to complete a second task of the job, wherein the second user interface includes a second image representative of the second task.

In another embodiment, a device is provided. The device includes an interface configured to enable network communications, a memory, and one or more processors coupled to the interface and the memory, and configured to expose a first user interface consistent with a first technology expertise to a first user, receive, as input from the first user via the first user interface, first information sufficient to complete a first task of a job that relies on both the first technology expertise and on a second technology expertise, wherein the first user interface includes a first image representative of the first task, in response to detecting that the first task is complete, expose a second user interface consistent with the second technology expertise to a second user, and receive, via the second user interface, as input from the second user, second information sufficient to complete a second task of the job, wherein the second user interface includes a second image representative of the second task.

Example Embodiments

Embodiments described herein provide an approach to automation tooling that allows users (e.g., network operators, administrators, or technology "experts") to operate IP and optical network layers with minimal change to their existing ways of operation while giving them the opportunity to evolve as they adopt a converged IP/optical networking solution on a larger scale.

For example, when DCO (digital coherent optics) are used to replace transponders and are directly inserted into routers, this "collapses" the optical and IP layers. A DCO device comprises the optical component of the network (that is configured with, e.g., elements such as wavelength, optical powers, line quality), as well as an IP component (that is configured with IP addressing, interface bundling, Layer 2 switching) all in one entity. One of the challenges in network operations is delineating who "owns" and manages the DCO, as transponders are traditionally managed by an optical team, but the DCO may now be a component of the routers, physically, and are configured to perform traditional IP networking functions.

As will be explained in more detail herein, and in an effort to enable a first type of expert (e.g., an IP routing expert) and a second type of expert (e.g., an optical networking expert) to operate together in both relatively separate domains, but eventually in a converged domain, a system and methodology is presented herein that enable a technology-based user experience (UX) to be presented to each of the first type of expert and the second type of expert.

This approach relies on multiple technology personalities (personas), i.e., a tooling functionality that adapts how technology experts operate their layer(s) of the network and evolves its usability as the technology experts adopt the technology. For example, the optical technology experts may only be presented with an optical UX as if the tool is an optical tool that they are used to operating, while the tool shares a same database to support other personas (e.g., an IP routing persona). As the convergence of technology picks up, additional personas can be developed.

Thus, at a high level, and as will be explained in more detail below, a persona-based user experience (PBUX) for optical networking and IP routing, according to the described embodiments, is described and may provide a simplified and relevant user experience without unnecessary distractions, may reduce tool insertion resistance by modeling user experience in the tool instead of forcing users to adapt their operating model to the new tool, may enable user personas to evolve as technology adoption accelerates, providing a smooth path to convergence, and may allow for additional personas to be developed where user needs arise.

FIG. 1 shows a network 100 including IP routing and optical networking components along with a network controller 150 that hosts or is in communication with persona-based user experience (PBUX) logic 180, according to an example embodiment. A PBUX database 190 is in communication with PBUX logic 180.

Network 100 may further include a router 120, DCO interface 101, DCO ports 102, DCO optical components 103, optical transport 104 (e.g., fiber optic cable), a reconfigurable optical add/drop multiplexer (ROADM) 105, and work controller 150 is in communication with each of router 120, router 122, DCO elements, and ROADM 105.

Technology experts may, potentially, have three different ways or models to manage DCO interfaces 101 and other components of network 100. For example, in an Optical Model, an optical networking expert or persona may be comfortable operating or configuring DCO optical components 103 and optical transport 104, while an IP routing expert or persona may not be comfortable operating or configuring DCO interfaces 101 and DCO ports 102. To complete an end-to-end multi-layer path for traffic, these two personas may need to collaborate to provision the desired service. In this regard, separate IP routing and optical network models may be presented by PBUX logic 180 to each of the IP routing expert and the optical networking expert. A converged model, also supported by PBUX logic 180, may be appropriate for some technology experts. Notably, as technology experts move from their siloed models to a converged model, PBUX logic 180 is configured to provide support for a converged persona (or Convergence Engineer (CE)) that corresponds to a technology expert skilled at both IP routing and optical networking.

According to an embodiment, PBUX logic 180 provides a tailored experience for each technology expert or persona. Different technology experts operate on the same network infrastructure and database (e.g., PBUX database 190) but their respective user experiences are tailored for each persona. Specifically, a given UX may include different task permissions, user interface (UI) gadgets and capabilities, and workflows. Technology experts, via their personas, can collaborate to complete an interdependent work order (e.g., a job), such as a multilayer service provisioning that creates an IP connection over an optical circuit.

In an embodiment, an optical networking expert logged into the system may only see optical provisioning tasks, UI, and optical network view, and yet what is being provisioned by this persona will be made available for the IP persona in a multilayer scenario. This gives the optical networking expert the same UX as if they were using an optical tool. This eases technology and tooling adoption for convergence-based solutions. As technology adoption matures, the functionality of each persona may evolve with it.

Table 1 below shows an example of the distribution of responsibilities or tasks for each of an IP routing expert, an optical networking expert, and a convergence engineer at an initial stage, and then at a future stage when convergence of technology expertise is more likely.

TABLE 1

|  | IP routing experts | Optical networking experts | Convergence engineers |
|---|---|---|---|
| Initial stage | IP transport and service provisioning | Optical transport and service provisioning | Multilayer provisioning |
|  | IP maintenance | Optical maintenance | Multilayer maintenance escalation |
|  | IP visualization | Optical visualization | Multilayer visualization |
|  | IP design | Optical design | Multilayer design |
| Future stage | IP maintenance | Optical maintenance | Converged provisioning |
|  | IP visualization | Optical visualization | Converged maintenance |
|  |  |  | Converged visualization | a router 122, with similar components as router 120 with DCO interface 101, DCO ports 102, DCO optical components 103. Those skilled in the art will appreciate that network 100 is merely an example, and in a typical production network there may be hundreds or even thousands of routers and related supporting components. As shown, net- As can be seen from Table 1, at an initial stage, when each technology expert is more siloed, each is responsible for their respective tasks. However, as the technology experts become more familiar with each other's domains, each technology expert will have fewer domain-specific overall tasks to manage in their respective domains.

FIGS. 2-14 and 15A-15C, described next, illustrate data stored in PBUX database 190 and how PBUX logic 180 is used to update that data in view of a given job and tasks associated with that job.

FIG. 2 is a table stored in PBUX database 190 that lists users and their corresponding expertise, according to an example embodiment. In an embodiment, an administrator, via PBUX logic 180, creates or updates technology personas and assigns technology experts (e.g., Bob, Alice, Mark, Jane) to technology personas. Those skilled in the art will appreciate that many other fields may be included in such a user table.

FIG. 3 is a table stored by PBUX database 190 that identifies persona-specific capabilities for respective technology personas, according to an example embodiment. PBUX logic 180 is configured to enable the administrator (e.g., Bob) to update persona capability to accommodate different requirements during technology adoption evolution. In the illustrated example, capabilities include inventory, visualization, provisioning, and maintenance for networking.

FIG. 4 is an example job table stored by PBUX database 190 that tracks a job, according to an example embodiment. The example job table of FIG. 4 includes a Job ID field, a Type field (in this case, a point-to-point optical service), a User name field (e.g., Mark who is an optical networking expert), a status field, an identification of an Endpoint A field, a port number at Endpoint A field, an Endpoint Z field, a port number at Endpoint Z field, a desired bandwidth field (e.g., 400G), and a job detail link that, when clicked (e.g. with a mouse, via touch screen, etc.), may provide further details about the listed job.

FIG. 5 is an example job queue (or task) table stored by PBUX database 190 that tracks a job (or task) queue, according to an example embodiment. As shown, the job (or task) queue table of FIG. 5 includes a Queue ID field, a type or task field (e.g., service provisioning), a status field, a User name (e.g., Mark who is an optical networking expert), a User persona field (e.g., optical), a Next Assigned User field (e.g., Alice who is an IP routing expert), a Next Assigned Persona field (in this case, IP), a Job (or task) ID field with a link, and a Queue log field, also with a link.

FIGS. 2-5 provide a basic outline of the data stored in PBUX database 190. FIGS. 6-14 provide a practical example of the operations of PBUX logic 180 and PBUX database 190.

FIG. 6 is an image 600 displayed, e.g., via a first user interface, for a user having IP routing expertise, according to an example embodiment. In this example, Alice creates a new IP service type (P2P IP service), and creates a new job. Alice may, for example, provision two endpoints with ports, provide IP addressing information, and provide QoS constraints such as bandwidth, latency, and diversity, all via PBUX logic 180. After her IP-related job (or task) is completed successfully, the job ID status is updated, as shown in FIG. 7, which shows an updated job table in view of completed IP routing tasks, according to an example embodiment. This initiates a new job (or task) queue linked to the job ID. Alice may then assign a next task user Mark (optical networking expert) to complete the next task, which is to provision the Optical transport, as shown in FIG. 8. A message (generated, e.g., by PBUX logic 180), such as an email or a Slack message, may be sent to user Mark to indicate there is a pending task for him to complete.

Figures 9, 10, 11:
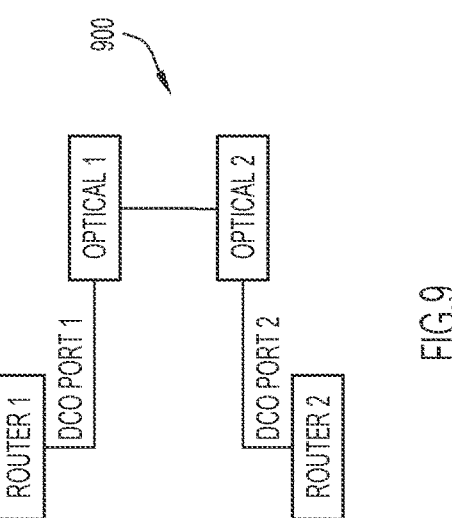
FIG. 9 is an image displayed, via a second user interface, for a user having optical networking expertise, according to an example embodiment.
FIG. 10 shows an updated job table in view of completed optical networking tasks, according to an example embodiment.
FIG. 11 shows an updated queue table in view of optical networking tasks, according to an example embodiment.

More specifically, FIG. 9 is an image 900 displayed, via a second user interface, for a user having optical networking expertise (e.g., Mark), according to an example embodiment. Mark may be tasked with providing information related to, e.g., two endpoints with ports, including interconnect add/drop ports, wavelength, optical power levels, modulation mode(s), forward error correction, and path selection. Upon providing such information via PBUX logic 180, and thus completing his task, Mark may assign the job back to Alice to complete IP service provisioning, as shown in FIG. 10.

FIG. 11 shows an updated job queue table in view of the completed optical networking tasks by Mark (optical networking expert), according to an example embodiment. In this case, Mark has assigned the next task back to Alice.

FIG. 12 is an updated image 1200 displayed, via the first user interface, for a user (Alice) having IP routing expertise, according to an example embodiment. Now that the optical networking tasks have been completed, the image of FIG. 12 shows a solid line connecting router1 and router2, thus indicating that the connection is complete or provisioned. Alice may then further enter via PBUX logic 180 additional information such as IGP protocols and IP service, leading to an update in PBUX database 190 represented by FIG. 13, which shows an updated job table in view of Alice's further IP routing tasks, and FIG. 14, which shows an updated job queue table in view of the completed further IP routing tasks, according to an example embodiment.

Figure 15A:
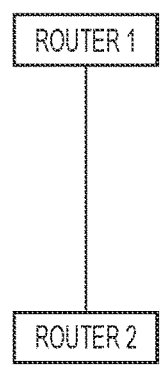
FIGS. 15A, 15B, and 15C show images that may be shown to, respectively, a user having IP routing expertise, a user having optical networking expertise, and a user having converged IP and optical expertise, according to an example embodiment.
Figure 15B:
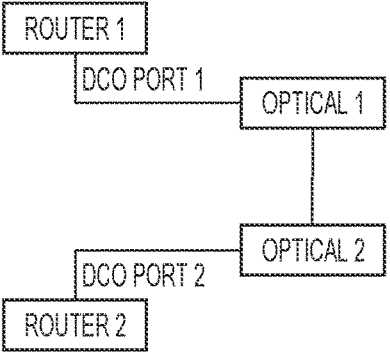
Figure 15C:
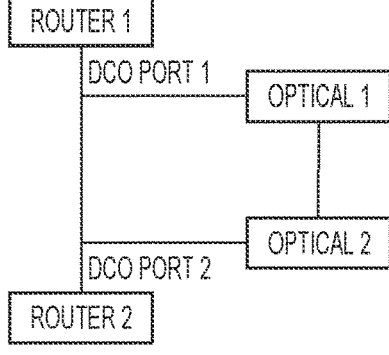

FIGS. 15A, 15B, and 15C show images that may be shown to, respectively, a user having IP routing expertise (e.g., Alice), a user having optical networking expertise (Mark), and a user having converged IP and optical expertise (e.g., Jane), according to an example embodiment. As shown, FIG. 15A is focused primarily on IP routing visualization, FIG. 15B is focused primarily on optical networking visualization, and FIG. 15C shows an image that a converged IP routing and optical networking expert might find useful in that both layers, IP and optical, are presented via a user interface.

Figure 16:
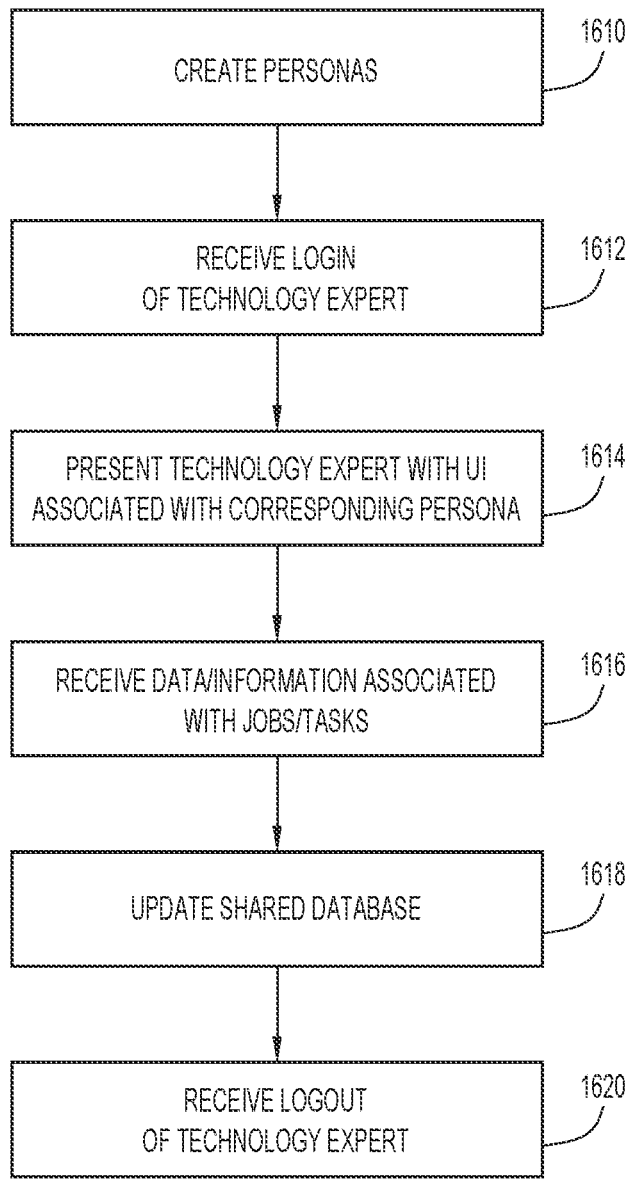
FIG. 16 is a flowchart showing an example use of PBUX logic execution, according to an example embodiment.

FIG. 16 is a flowchart showing an example use of PBUX logic 180 execution, according to an example embodiment. At 1610, an operation is configured to create personas. This operation may include, e.g., an administrator who creates regular users and admin tasks, creates or updates technology personas, assigns regular users to technology personas, configures or customizes the task attributes for each technology persona, and creates or updates the several tables described herein.

At 1612, an operation is configured to receive a login from a technology expert. The technology expert may be authenticated in any known manner.

At 1614, an operation is configured to present the technology expert with a user interface and workflow associated with, or designed for, a corresponding persona. Once the technology expert is logged in, he may be presented with a default UI and task attributes as configured by an admin user, or be presented with a persona-selected customization, such as customized visualization options. A persona user may receive UI messages from other persona users, such as a new task assignment in the queue.

At 1616, an operation is configured to receive data and or information associated with jobs or tasks performed by the logged-in technology expert. Persona user tasks are tracked by the job and job queue tables. A work order may be created through the job table that is linked to a set of jobs (or tasks) in the order. A persona user can assign a next persona user to work on a next pending task. Persona users may collaborate through the job queue until the work order is completed. As the tasks are completed, and at 1618, an operation is configured to update a database that is shared among different personas. At 1620, an operation is configured to receive a log out of the technology expert.

FIG. 17 is a flowchart illustrating a series of operations that may be executed by PBUX logic, according to an example embodiment. At 1702, an operation is configured to expose a first user interface consistent with a first technology expertise to a first user. At 1704, an operation is configured to receive, as input from the first user via the first user interface, first information sufficient to complete a first task of a job that relies on both the first technology expertise and on a second technology expertise, wherein the first user interface includes a first image representative of the first task. At 1706, an operation is configured, in response to detecting that the first task is complete, to expose a second user interface consistent with the second technology expertise to a second user. And, at 1708, an operation is configured to receive, via the second user interface, as input from the second user, second information sufficient to complete a second task of the job, wherein the second user interface includes a second image representative of the second task.

Figure 18:
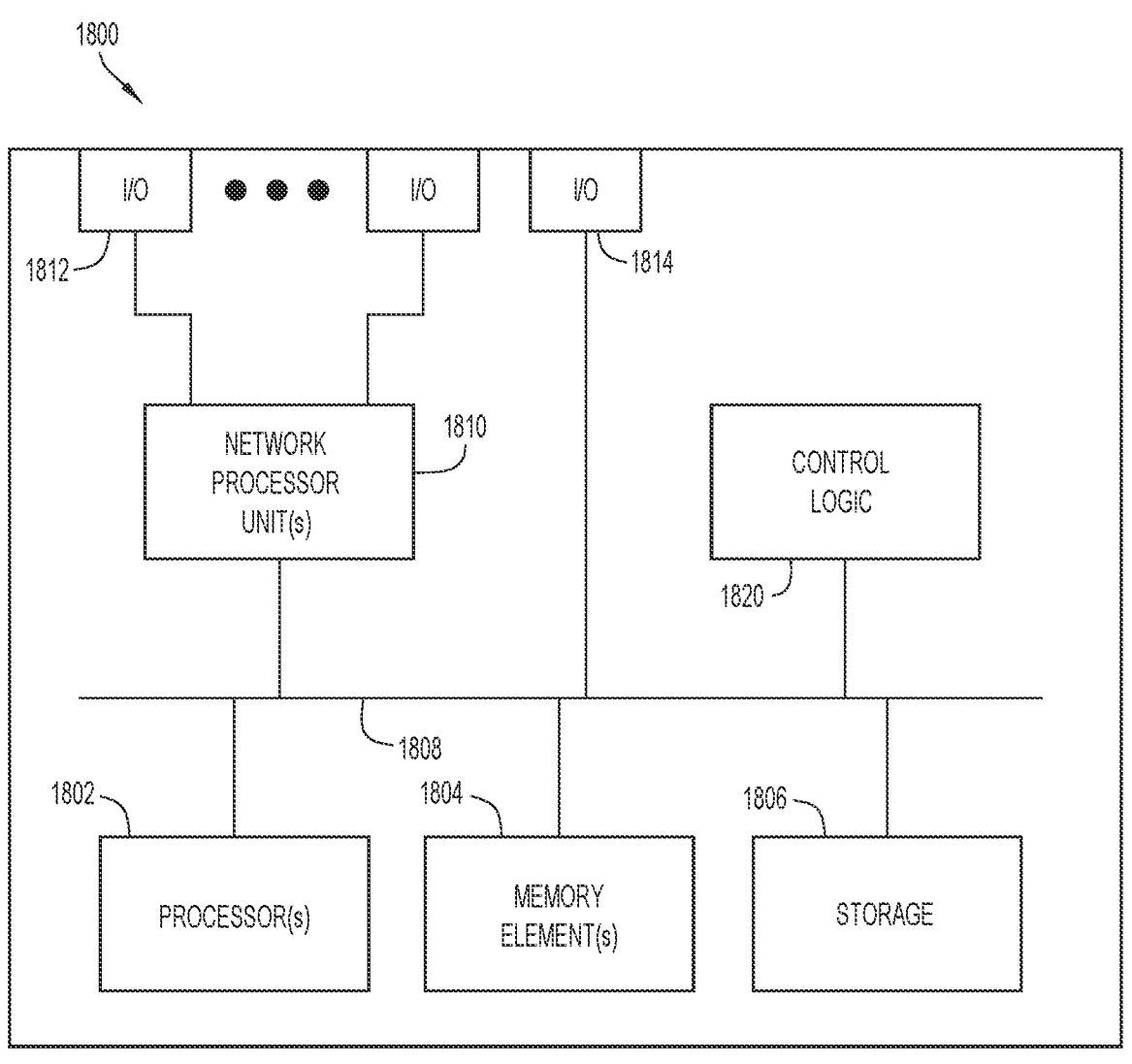
FIG. 18 is a block diagram of a computing device that may be configured to host PBUX logic, and perform the techniques described herein, according to an example embodiment.

FIG. 18 is a block diagram of a computing device that may be configured to host PBUX logic 180, and perform the techniques described herein, according to an example embodiment. In various embodiments, a computing device, such as computing device 1800 or any combination of computing devices 1800, may be configured as any entity/ entities as discussed for the techniques depicted in connection with FIGS. 1-17 in order to perform operations of the various techniques discussed herein.

In at least one embodiment, the computing device 1800 may include one or more processor(s) 1802, one or more memory element(s) 1804, storage 1806, a bus 1808, one or more network processor unit(s) 1810 interconnected with one or more network input/output (I/O) interface(s) 1812, one or more I/O interface(s) 1814, and control logic 1820 (which could include, for example, PBUX logic 180). In various embodiments, instructions associated with logic for computing device 1800 can overlap in any manner and are not limited to the specific allocation of instructions and/or operations described herein.

In at least one embodiment, processor(s) 1802 is/are at least one hardware processor configured to execute various tasks, operations and/or functions for computing device 1800 as described herein according to software and/or instructions configured for computing device 1800. Processor(s) 1802 (e.g., a hardware processor) can execute any type of instructions associated with data to achieve the operations detailed herein. In one example, processor(s) 1802 can transform an element or an article (e.g., data, information) from one state or thing to another state or thing. Any of the potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1804 and/or storage 1806 is/are configured to store data, information, software, and/or instructions associated with computing device 1800, and/or logic configured for memory element(s) 1804 and/or storage 1806. For example, any logic described herein (e.g., control logic 1820) can, in various embodiments, be stored for computing device 1800 using any combination of memory element(s) 1804 and/or storage 1806. Note that in some embodiments, storage 1806 can be consolidated with memory element(s) 1804 (or vice versa) or can overlap/exist in any other suitable manner.

In at least one embodiment, bus 1808 can be configured as an interface that enables one or more elements of computing device 1800 to communicate in order to exchange information and/or data. Bus 1808 can be implemented with any architecture designed for passing control, data, and/or information between processors, memory elements/storage, peripheral devices, and/or any other hardware and/or software components that may be configured for computing device 1800. In at least one embodiment, bus 1808 may be implemented as a fast kernel-hosted interconnect, potentially using shared memory between processes (e.g., logic), which can enable efficient communication paths between the processes.

In various embodiments, network processor unit(s) 1810 may enable communication between computing device 1800 and other systems, entities, etc., via network I/O interface(s) 1812 (wired and/or wireless) to facilitate operations discussed for various embodiments described herein. In various embodiments, network processor unit(s) 1810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1800 and other systems, entities, etc. to facilitate operations for various embodiments described herein. In various embodiments, network I/O interface(s) 1812 can be configured as one or more Ethernet port(s), Fibre Channel ports, any other I/O port(s), and/or antenna (s)/antenna array(s) now known or hereafter developed. Thus, the network processor unit(s) 1810 and/or network I/O interface(s) 1812 may include suitable interfaces for receiving, transmitting, and/or otherwise communicating data and/ or information in a network environment.

I/O interface(s) 1814 allow for input and output of data and/or information with other entities that may be connected to computing device 1800. For example, I/O interface(s) 1814 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1820 can include instructions that, when executed, cause processor(s) 1802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read-only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1804 and/or storage 1806 can store data, software, code, instructions (e.g., processor instructions), logic, parameters, combinations thereof, and/or the like used for operations described herein. This includes memory element (s) 1804 and/or storage 1806 being able to store data, software, code, instructions (e.g., processor instructions), logic, parameters, combinations thereof, or the like that are executed to carry out operations in accordance with the teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software-defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc., as discussed for various embodiments described herein may be performed among entities that may be directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc., which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores, or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic, or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further, as referred to herein, 'at least one of' and 'one or more of' can be represented using the '(s)' nomenclature (e.g., one or more element(s)).

In sum, a method may include exposing a first user interface consistent with a first technology expertise to a first user, receiving, as input from the first user via the first user interface, first information sufficient to complete a first task of a job that relies on both the first technology expertise and on a second technology expertise, wherein the first user interface includes a first image representative of the first task, in response to detecting that the first task is complete, exposing a second user interface consistent with the second technology expertise to a second user, and receiving, via the second user interface, as input from the second user, second information sufficient to complete a second task of the job, wherein the second user interface includes a second image representative of the second task.

The method may further include registering the first user having the first technology expertise as a first persona in a persona-based user experience system, and registering the second user having the second technology expertise as a second persona in the persona-based user experience system.

The method may also include assigning at least one of inventory, visualization, provisioning, or maintenance capabilities to each of the first persona and the second persona.

The method may further include updating a shared database with the first information and the second information.

In the method, the job may include provisioning a connection between a first network device and a second network device.

In the method, the first network device may be a first router, and the second network device may be a second router.

In the method, the first task may include provisioning an Internet Protocol connection between the first router and the second router.

In the method, the second task may include provisioning an optical connection between the first router and the second router.

The method may further include configuring digital coherent optics (DCO) in each of the first router and the second router.

The method may further include displaying, to the first user via the first user interface, elements that relate to the second technology expertise so as to progressively expose the first user to aspects of the second technology expertise to enable the first user to interact with the second user interface.

In another embodiment, a device may be provided and may include an interface configured to enable network communications, a memory, and one or more processors coupled to the interface and the memory, and configured to: expose a first user interface consistent with a first technology expertise to a first user, receive, as input from the first user via the first user interface, first information sufficient to complete a first task of a job that relies on both the first technology expertise and on a second technology expertise, wherein the first user interface includes a first image representative of the first task, in response to detecting that the first task is complete, expose a second user interface consistent with the second technology expertise to a second user, and receive, via the second user interface, as input from the second user, second information sufficient to complete a second task of the job, wherein the second user interface includes a second image representative of the second task.

In the device, the one or more processors may be further configured to register the first user having the first technology expertise as a first persona in a persona-based user experience system, and register the second user having the second technology expertise as a second persona in the persona-based user experience system.

In the device, the one or more processors may be further configured to assign at least one of inventory, visualization, provisioning, or maintenance capabilities to each of the first persona and the second persona.

In the device, the job may include provisioning a connection between a first network device and a second network device.

In the device, the first network device may be a first router, and the second network device may be a second router.

In the device, the first task may include provisioning an Internet Protocol connection between the first router and the second router.

In the device, the second task may include provisioning an optical connection between the first router and the second router using digital coherent optics (DCO) in each of the first router and the second router.

In yet another embodiment, one or more non-transitory computer readable storage media encoded with instructions are provided and, when executed by a processor, cause the processor to expose a first user interface consistent with a first technology expertise to a first user, receive, as input from the first user via the first user interface, first information sufficient to complete a first task of a job that relies on both the first technology expertise and on a second technology expertise, wherein the first user interface includes a first image representative of the first task, in response to detecting that the first task is complete, expose a second user interface consistent with the second technology expertise to a second user, and receive, via the second user interface, as input from the second user, second information sufficient to complete a second task of the job, wherein the second user interface includes a second image representative of the second task.

The instructions may be further configured to register the first user having the first technology expertise as a first persona in a persona-based user experience system, and register the second user having the second technology expertise as a second persona in the persona-based user experience system.

The instructions may be further configured to assign at least one of inventory, visualization, provisioning, or maintenance capabilities to each of the first persona and the second persona.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art, and it is intended that the present disclosure encompass all such changes, substitutions, variations, alterations, and/or modifications as falling within the scope of the appended claims.

What is claimed is:

1. A method comprising:
exposing a first user interface consistent with Internet Protocol technology expertise to a first user;
receiving, as input from the first user via the first user interface, first information sufficient to complete an Internet Protocol task to complete a network connection between two endpoints that relies on both the Internet Protocol technology expertise and on optical communication technology expertise, wherein the first user interface includes a first image representative of the Internet Protocol task;
in response to detecting that the Internet Protocol task is complete, exposing a second user interface consistent with the optical communication technology expertise to a second user; and
receiving, via the second user interface, as input from the second user, second information sufficient to complete an optical communication task to complete the network connection between two endpoints, wherein the second user interface includes a second image representative of the optical communication task.

2. The method of claim 1, further comprising:
registering the first user having the Internet Protocol technology expertise as a first persona in a persona-based user experience system; and
registering the second user having the optical communication technology expertise as a second persona in the persona-based user experience system.

3. The method of claim 2, further comprising assigning at least one of inventory, visualization, provisioning, or maintenance capabilities to each of the first persona and the second persona.

4. The method of claim 1, further comprising updating a shared database with the first information and the second information.

5. The method of claim 1, further comprising provisioning a connection between a first network device and a second network device.

6. The method of claim 5, wherein the first network device is a first router, and the second network device is a second router.

7. The method of claim 6, wherein the Internet Protocol task comprises provisioning an Internet Protocol connection between the first router and the second router.

8. The method of claim 6, wherein the optical communication task comprises provisioning an optical connection between the first router and the second router.

9. The method of claim 8, further comprising configuring digital coherent optics (DCO) in each of the first router and the second router.

10. The method of claim 1, further comprising displaying, to the first user via the first user interface, elements that relate to the optical communication technology expertise so as to progressively expose the first user to aspects of the optical communication technology expertise to enable the first user to interact with the second user interface.

11. A device comprising:
an interface configured to enable network communications;
a memory; and
one or more processors coupled to the interface and the memory, and configured to:
expose a first user interface consistent with internet Protocol technology expertise to a first user;
receive, as input from the first user via the first user interface, first information sufficient to complete an Internet Protocol task to complete a network connection between two endpoints that relies on both the Internet Protocol technology expertise and on optical communication technology expertise, wherein the first user interface includes a first image representative of the Internet Protocol task;
in response to detecting that the Internet Protocol task is complete, expose a second user interface consistent with the optical communication technology expertise to a second user; and
receive, via the second user interface, as input from the second user, second information sufficient to complete an optical communication task to complete the network connection between two endpoints, wherein the second user interface includes a second image representative of the optical communication task.

12. The device of claim 11, wherein the one or more processors are further configured to:
register the first user having the Internet Protocol technology expertise as a first persona in a persona-based user experience system; and register the second user having the optical communication technology expertise as a second persona in the persona-based user experience system.

13. The device of claim 12, wherein the one or more processors are further configured to assign at least one of inventory, visualization, provisioning, or maintenance capabilities to each of the first persona and the second persona.

14. The device of claim 11, wherein the one or more processors are further configured to provision a connection between a first network device and a second network device.

15. The device of claim 14, wherein the first network device is a first router, and the second network device is a second router.

16. The device of claim 15, wherein the Internet Protocol task comprises provisioning an Internet Protocol connection between the first router and the second router.

17. The device of claim 15, wherein the optical communication task comprises provisioning an optical connection between the first router and the second router using digital coherent optics (DCO) in each of the first router and the second router.

18. One or more non-transitory computer readable storage media encoded with instructions that, when executed by a processor, cause the processor to:

expose a first user interface consistent with Internet Protocol technology expertise to a first user;

receive, as input from the first user via the first user interface, first information sufficient to complete an Internet Protocol task to complete a network connection between two endpoints that relies on both the Internet Protocol technology expertise and on optical communication technology expertise, wherein the first user interface includes a first image representative of the Internet Protocol task;

in response to detecting that the Internet Protocol task is complete, expose a second user interface consistent with the optical communication technology expertise to a second user; and receive, via the second user interface, as input from the second user, second information sufficient to complete an optical communication task to complete the network connection between two endpoints, wherein the second user interface includes a second image representative of the optical communication task.

19. The one or more non-transitory computer readable storage media of claim 18, wherein the instructions are configured to:

register the first user having the Internet Protocol technology expertise as a first persona in a persona-based user experience system; and register the second user having the optical communication technology expertise as a second persona in the persona-based user experience system.

20. The one or more non-transitory computer readable storage media of claim 19, wherein the instructions are configured to:

assign at least one of inventory, visualization, provisioning, or maintenance capabilities to each of the first persona and the second persona.

\* \* \* \* \*